US010810106B1

(12) United States Patent
Amit et al.

(10) Patent No.: US 10,810,106 B1
(45) Date of Patent: Oct. 20, 2020

(54) AUTOMATED APPLICATION SECURITY MATURITY MODELING

(71) Applicant: Amazon Technologies, Inc., Seattle, WA (US)

(72) Inventors: Iftach Amit, New York, NY (US); Aaron Michael Brown, Seattle, WA (US); David Scott Cleckley, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 15/472,164

(22) Filed: Mar. 28, 2017

(51) Int. Cl.
*G06F 11/36* (2006.01)
*G06F 21/50* (2013.01)

(52) U.S. Cl.
CPC ...... *G06F 11/3644* (2013.01); *G06F 11/3604* (2013.01); *G06F 11/3692* (2013.01); *G06F 21/50* (2013.01)

(58) Field of Classification Search
None
See application file for complete search history.

(56) References Cited

U.S. PATENT DOCUMENTS

| | | | | |
|---|---|---|---|---|
| 7,315,826 B1* | 1/2008 | Guheen | ................... | G06Q 10/06 705/7.29 |
| 8,112,343 B1* | 2/2012 | Exner | .................... | G06Q 40/00 705/35 |
| 9,558,098 B1* | 1/2017 | Alshayeb | ............ | G06F 11/3604 |
| 2001/0049793 A1* | 12/2001 | Sugimoto | ........... | G06F 21/6218 726/1 |
| 2003/0004754 A1* | 1/2003 | Krutz | ..................... | G06Q 10/10 705/2 |
| 2005/0005152 A1* | 1/2005 | Singh | .................... | G06F 21/554 726/26 |
| 2007/0061191 A1* | 3/2007 | Mehrotra | ............... | G06Q 10/06 705/7.36 |
| 2007/0100892 A1* | 5/2007 | Kephart | ................. | G06Q 10/06 |
| 2008/0016208 A1* | 1/2008 | Treinen | ............... | H04L 63/1416 709/224 |
| 2008/0072328 A1* | 3/2008 | Walia | .................... | G06F 21/577 726/25 |
| 2009/0198801 A1* | 8/2009 | Waud | ...................... | G06F 8/656 709/221 |
| 2009/0249489 A1* | 10/2009 | Livshits | .................. | G06F 21/54 726/26 |

(Continued)

OTHER PUBLICATIONS

"Capability Maturity Model," Wikipedia, The Free Encyclopedia, Mar. 20, 2017, <https://en.wikipedia.org/wiki/Capability_Maturity_Model> [retrieved Mar. 29, 2017], 6 pages.

*Primary Examiner* — Jason D Mitchell
(74) *Attorney, Agent, or Firm* — Davis Wright Tremaine LLP (57) ABSTRACT

A security and maturity service is provided to generate a security score for an application. A set of data points are obtained, the data points indicating application information for an application. The data points may be associated with a particular axis of a plurality of axes defined by a scoring model. Furthermore, the scoring model may define a score for each axes based at least in part on the data points. A security score for the application may then be determined based at least in part on the score for the plurality of axes.

20 Claims, 7 Drawing Sheets

(56) References Cited

U.S. PATENT DOCUMENTS

| | | | |
|---|---|---|---|
| 2009/0319771 A1* | 12/2009 | Nagaraja | G06F 21/606 |
| | | | 713/151 |
| 2010/0275263 A1* | 10/2010 | Bennett | G06F 21/577 |
| | | | 726/25 |
| 2011/0239200 A1* | 9/2011 | Binsztok | G06F 8/311 |
| | | | 717/140 |
| 2014/0075560 A1* | 3/2014 | Guy | G06F 21/577 |
| | | | 726/25 |
| 2014/0123110 A1* | 5/2014 | Wan | G06F 11/3672 |
| | | | 717/124 |
| 2015/0058095 A1* | 2/2015 | Clay | G06Q 10/06395 |
| | | | 705/7.41 |
| 2015/0378722 A1* | 12/2015 | Zuniga-Hernandez | |
| | | | G06F 8/60 |
| | | | 717/103 |
| 2017/0344901 A1* | 11/2017 | Ronen | G06N 5/04 |

\* cited by examiner

| | Application$_0$ | Application$_1$ | Application$_2$ | ... | Application$_n$ |
|---|---|---|---|---|---|
| Axis$_0$ | Score$_{00}$ | Score$_{01}$ | Score$_{02}$ | ... | Score$_{0n}$ |
| Axis$_1$ | Score$_{10}$ | Score$_{11}$ | Score$_{12}$ | ... | Score$_{1n}$ |
| Axis$_2$ | Score$_{20}$ | Score$_{21}$ | Score$_{22}$ | ... | Score$_{2n}$ |
| ... | ... | ... | ... | ... | ... |
| Axis$_m$ | Score$_{m0}$ | Score$_{m1}$ | Score$_{m2}$ | ... | Score$_{mn}$ |
| Overall | Score$_0$ | Score$_1$ | Score$_2$ | ... | Score$_n$ |

Security Score and Statistical Model Information

AUTOMATED APPLICATION SECURITY MATURITY MODELING

BACKGROUND

A data center is a facility that houses computer systems and various networking, storage, and other related components. Data centers may, for example, provide computing services to businesses and individuals as a remote computing service or provide "software as a service" (e.g., cloud computing). Furthermore, in a large distributed computing system (e.g., multiple distributed data centers) of a computing resource service provider, various customers, users, services, and resources of the computing resource service provider are in frequent communication with each other over various networks and intermediaries. In addition, these customers, users, services, and resources may be constantly changing. Keeping these systems secure becomes more challenging as services and computing resources are modified, added, or removed from these large distributed computing systems and as the complexity and usage of these systems increases. In such distributed computing systems, it can be difficult to identify any vulnerabilities of the system and to efficiently allocate resources to identify and remediate any vulnerabilities of the system. Furthermore, it can also be difficult to isolate and troubleshoot issues with these systems, and even when issues are identified, reliably securing the system may be challenging. In addition, compliance with various standards and regulations may increase the complexity of these problems.

BRIEF DESCRIPTION OF THE DRAWINGS

Various techniques will be described with reference to the drawings, in which.

DETAILED DESCRIPTION

In various examples described below, a security engine collects various data points associated with an application or service of a computing resource service provider or other entity and determines a security score for the application or service. In addition, the security score and data points are distributed or otherwise organized into axes. Each axis may represent one or more categories or types of data points. For example, as described in greater detail below, application security may be an axis containing various data points such as number of lines of code in the application, number of new or modified lines of code, number of software errors (e.g., bugs), days since last software revision, number of security incidents associated with the application, or any other data associated with source code or executable instructions of the application or service. The security score may be a metric or other measurement of security risks posed to a particular application or service. This information may enable organizations such as the computing resource service provider to assign and/or provide security resources to particular applications or services based at least in part on the security risks posed to the applications or services of the organization.

In an embodiment, a security and maturity service continuously obtains and aggregates information associated with application and services of one or more organizations, such as a computer resource service provider. For example, the security and maturity service obtains logs or other information generated by an application as well as logs and other information generated by the computing resources supporting the application. In another example, some organizational information is obtained from an entity of the organization, such as a software engineer. This information may then be stored by the security and maturity service. In addition, historical data may be stored by the security and maturity service and a historical snapshot may be maintained to track the development and maturity of a particular application or service. Furthermore, in various embodiments, this information is used to generate the data points or measurements used to generate a score for a particular axis.

For example, the security and maturity service obtains data points indicating a number of software errors, a number of known security vulnerabilities, and a rate at which the organization providing the application addresses the software errors and known security vulnerabilities. The security engine or other component of the security and maturity service may categorize these data points along a single axis (e.g., application information). A score may then be assigned to each data point based on a scoring model or other scoring rules. For example, the Capability Maturity Model (CMM) is used to assign a score of 1 to 5 for each data point in the axis. The CMM is a structured scoring model for evaluating the maturity of an application by defining behaviors, characteristics, practices, and/or processes of an organization that can produce a particular outcome. Although the use of CMM is described in the present disclosure, any scoring model may be used in connection with the various embodiments described. In addition, as described in greater detail below, the scoring model may be modified based at least in part on statistical modeling and/or machine learning algorithms.

Returning to the example above, once the data points are obtained and organized into axes, a security score may be assigned to each axis based at least in part on the data points for the axis and the scoring model. In addition, various weights may be assigned to a particular data point. In one example, the weight for a data point is assigned a value between zero and one indicating an amount of influence that particular data point has on an overall score of the axis. In an embodiment, an infrastructure axis has three data points: up to data patch level, known patch vulnerabilities, and average number of days to update patch level after release of a new patch. In this embodiment, the organization may want to assign full weight (e.g., a value of one) to the data point indicating that the patch level is up to date but may be less concerned about the amount of time it took to apply the patch so half weight (e.g., a value of 0.5) is assigned to the data point indicating the average number of days to update patch level after release of a new patch. Based at least in part on the assigned weights to each data point, a score may be determined for each axis and an overall score determined for all axes combined. As described above, the score for each axis may aid an organization in distributing security resources, and the overall score for the application or service may provide a benchmark for comparison between applications.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

example, the application may include a web-based application such as an electronic marketplace.

Various systems may provide the security engine 118 with data points 112 associated with one or more applications. For example, a logging service may provide log data to the security engine 118. In another example, users of the security engine 118 may provide information directly to the security service through a user interface provided by the security engine 118 or other system. As described in greater detail below, the data points 112 may be stored in a data store, database, or other storage location. The data points 112 may include any information or measure of the application. For example, the data points 112 may include information about the application such as best practices used and measures of the application such as number of host computer systems executing the application. The table below illustrates example data points 112 associated with an application.

| Application Metrics | Security Metrics | Hardware Metrics | Organizational Metrics |
| --- | --- | --- | --- |
| Number of new or changed lines of source code | Number of service calls or dependencies | Number of new network addresses | Number of hosts computer systems utilized |
| Number of new data types | New application program interface (API) calls | Change in visibility (e.g., becoming public) | Number of customer |
| Version lag (e.g., how many versions behind is the applications libraries or dependencies | Open ports | Host computer system configuration | Results of security scans |
| Number of policy exceptions | New security risks | Average time to resolve security risks | Number of security incidents |
| Average time to resolve security incidents | Number of security certified development team members | Automates alarms | Number of alarms per interval of time |

Figure 1:
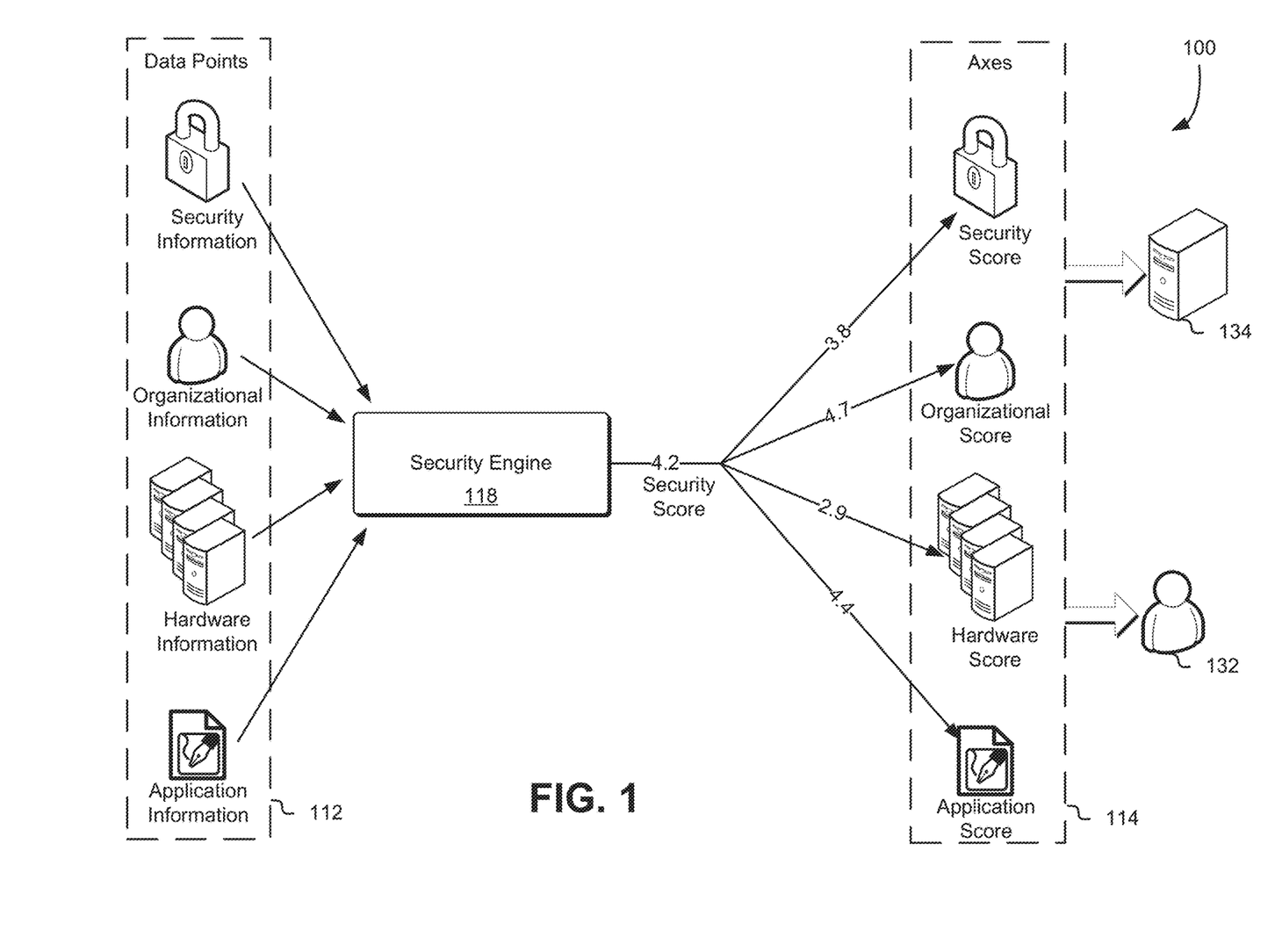
FIG. 1 illustrates an environment in which a security engine generates a security score for an application based at least in part on one or more data points in accordance with an embodiment.

FIG. 1 illustrates an environment 100 in which a security engine 118 obtains information associated with an application and determines a security score associated with the application in accordance with an embodiment. In an embodiment, the security engine 118 utilizes a scoring model (e.g., CMM) to assign scores to one or more axes 114 of the application based at least in part on one or more data points 112. The security engine 118 may be a component of a service provided by a computing resource service provider as described in greater detail below. In yet other embodiments, the security engine 118 is a stand-alone application that is executed by one or more computer systems.

Furthermore, the security engine 118 may be implemented using computing resources provided by the computing resource service provider. For example, the computing resource service provider provides the necessary compute and storage resources to execute the security engine 118 and enable the operations of the security engine 118. As described above, the security engine 118 may be used to generate a security score for applications and service of the computing resources service provider or other entity. The security engine 118 may also monitor the operation and development of applications and continuously update and/or determine new security scores for the applications. The applications described in the present disclosure may include any application at any stage of development and can include services or components thereof. For example, the application may include a media streaming service or a database application of the media streaming service. As another As illustrated in the table above and FIG. 1, the data points 112 may be broken down or distributed between categories which correspond to particular axes. The axes 114 and associated data points 112 may be determined and/or provided by an entity of the computing resource service provider or other organization. For example, a security engineer determines which data points 112 are associated with which axes 114. In another example, the customer of the security engine 118 (e.g., the developer of the application which is being scored) determines axes 114 and which data points 112 are associated with each axis 114. In addition, several data points 112 may be combined into a single data point or measure. For example, a number of software bugs, a number of software vulnerabilities, and a rate of addressing the software bugs and software vulnerabilities are combined into a single data point.

The security model used to score the application across the various axes 114 based at least in part on the data points 112 in some embodiments also defines the various axes 114 and the data points 112 associated with each axis 114. As described in greater detail below, the data points 112 and axes 114 may be modified, added, or removed based at least in part on attributes of the application being scored. For example, a particular application utilizes payment information associated with customers of the application and, as a result, the data points 112 and axes 114 are modified to include additional security measures such as compliance with industry standards. As illustrated in FIG. 1, the security engine 118 determines a score for each axes 114 and an overall security score for the application. In the example illustrated in FIG. 1, a score is determined between 1 and 5, with 1 being the lowest possible score for a particular axis and 5 being the highest. Although a score between 1 and 5 is described in connection with FIG. 1, any means of determining a score including non-numerical scores are considered within the scope of the present disclosure.

In various embodiments, the security engine 118 determines a score for a particular axis based at least in part on the security model (e.g., CMM) by at least assigning values from 1 to 5 to represent the maturity level of the specific axis 114. For example, a maturity level and/or score of 1 may be assigned to an application in which the developer is not proactively finding security vulnerabilities in the application or correcting known security vulnerabilities. Alternatively, a maturity level and/or score of 5 may be assigned to an application in which the developer is proactively finding security vulnerabilities in the application and correcting known security vulnerabilities. In addition, as described in greater detail below, a weight or other value may be assigned to a particular data point or set of data points.

Furthermore, statistical modeling may be used to assign weights to data points 112 and determine correlations between data points 112. For example, particular data points used to determine a score for a particular axis may be weighted to have a greater or lower influence on the score for the particular axis. This may give the application developer a more useful score for the particular axis and provide better insight into the security risk posed to the application. For example, statistical modeling may be used to determine a correlation between the average amount of time it takes an application developer to update the patch level of host computer systems when a new patch is available and the likelihood of a security vulnerability created by an out-of-date patch level. As a result of this correlation, increased weight may be placed on the average amount of time it takes an application developer to update the patch level of the host computer systems data point. In addition, the security score may provide application developers with insight into the security of an application at various levels. For example, the overall score may provide a benchmark; however, the application developer can also see the score for each axis 114 and what data points 112 are impacting the security score.

Although 4 axes 114 are illustrated in FIG. 1, "security score," "organizational score," "hardware score," and "application score," any number of axes may be used in connection with the present disclosure, and different organizations may have different axes. For example, an application developer developing software for robotics may have axes directed to human safety while an application developer developing a financial application may have axes directed to financial safety. Additionally, as discussed in the present disclosure, the data points 112 may include additional data points not described in connection with FIG. 1, and the data points 112 may be specific to the application being scored by the security engine 118. For example, a data storage application may have a data point measuring a number of data objects processed by the application during a particular interval of time. As another example, an application developer may include as a data point a number of senior engineers developing the application.

In addition, the security score and components thereof (e.g., scores for particular axes) may be provided to various entities such as application owners 132 (e.g., application developers, software engineers, project managers, etc.) and other computer systems and services 134 (e.g., storage service, application front-ends, API vendors, etc.). In an embodiment, the security score is provided to the application owner 132 and/or other computer system 134 for analysis and metrics. For example, the application owner 132 may use the security score to evaluate security risks to the application and determine security resources such as money, engineers, and hardware to assign to the application or a particular axis of the application. Similarly, the security score may be provided to a web service front-end which allows other services and customers to interface with the web service front-end (e.g., through API calls) to obtain the security score or information associated with the security score. For example, the web service front-end may aggregate security scores for an organization and provide a comparison tool for comparing security scores for various applications of the organization.

Figure 2:
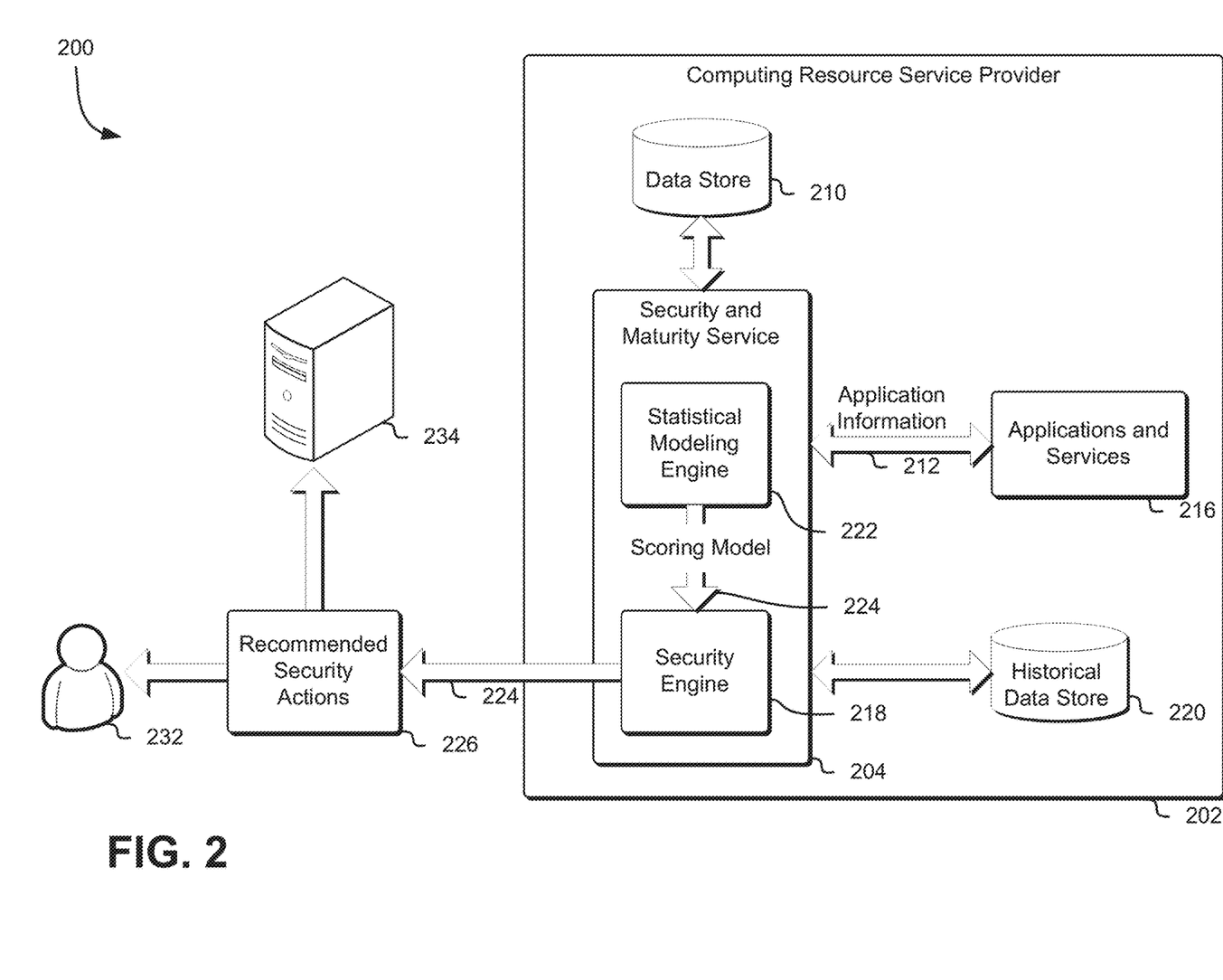
FIG. 2 illustrates an environment in which a security and maturity service generates recommended security actions for an application in accordance with an embodiment.

FIG. 2 illustrates an environment 200 in which a security and maturity service 204 provided by a computing resource service provider 202 determines a security score associated with an application and provides recommended security actions 226 based at least in part on the security score in accordance with an embodiment. In the example environment 200 illustrated in FIG. 2, a security engine 218 operating within an environment of the computing resource service provider 202 as described above receives application information 212 including data points used to determine a set of security scores for an application. The security and maturity service 204 may provide the recommended security actions 226 to a software developer 232 associated with a particular application or service. In one example, the software developer 232 is a senior engineer managing the developer of the particular application or service.

In some embodiments, the security and maturity service 204 obtains application information 212 from various locations associated with applications and service 216. The application information 212 may include various data points as described above. Furthermore, the application information 212 may be obtained from a variety of sources such as software developers, engineers, host computer systems executing all or a portion of the application, other services of the computing resources service provider 202, or other location within the computing resource service provider 202 environment or outside the computing resource service provider 202 environment. The application information 212 may be canonicalized, standardized, or normalized such that the same or similar data points obtained from two or more different sources results in the same security score or a particular axis or component of the security score for the particular axis. In addition, application information 212 may be stored in the data store 210 and the security engine 218, or a statistical modeling engine 222, described in greater detail below, may obtain the application information 212 from the data store 210 during operation.

Similarly, the security and maturity service 204 may maintain a historical data store 220. In one embodiment, the historical data store 220 contains information associated with a security score generated for a particular application including the data points, scoring model 224, axes, overall security score, and security score for each axis. This information may enable the statistical modeling engine to determine correlations between application information 212 and security risks to applications and services. In addition, the information maintained in the historical data store 220 may enable the software developer 232 to track historical performance and trends of various axes of applications and services. The data store 210 and historical data store 220 may be implemented by a block storage service, an on-demand storage service, an archival storage service, or a backup storage service or simply by storage resources provided by the computing resource service provider 202 or other entity. In one embodiment, statistical modeling engine 222 uses data in the data store 210 and/or historical data store 220 to generate and/or modify a scoring model 224. In addition, the scoring model 224 may be generated based at least in part on a third-party scoring model (e.g., CMM) and modified for use with a particular application or service as described above.

It should be noted that while FIG. 2 shows the applications and services 216 as being hosted in the environment of the computing resource service provider 202, in one embodiment at least a subset of the applications and services 216 is hosted in an environment of a customer of the computing resource service provider 202. In one embodiment, at least a subset of the applications and services 216 is hosted in an environment of a third party (e.g., neither the customer of the computing resource service provider 202 nor the computing resource service provider 202). Similarly, it should be noted that while FIG. 2 shows the data store 210 and the historical data store 220 as being located in the environment of the computing resource service provider 202, in one embodiment the set of data in the data store 210 and the historical data store 220 are located in an environment of a customer of the computing resource service provider 202. In yet another embodiment, the data store 210 and the historical data store 220 are located in an environment of a third party (e.g., neither the customer of the computing resource service provider 202 nor the computing resource service provider 202).

The security and maturity service 204, as described above, may be within the computing resource service provider 202 environment. This may provide the security and maturity service 204 with access to application information 212. In other embodiments, when either the security and maturity service 204 or the application information 212 is outside of the computing resource service provider 202 environment, the security and maturity service 204 may require access to the application information. In addition, the security and maturity service 204 may be provided with access credentials or other information required to obtain the application information 212 such as API call, web-service calls, resource locators or other information suitable to enable the security and maturity service 204 to obtain the application information 212.

The security and maturity service 204, in various embodiments, continuously obtains application information 212. All application information 212 obtained by the security and maturity service 204 may be aggregated into the data store 210. In addition, the security and maturity service 204 may periodically or aperiodically generate a historical snapshot of the application information 212 maintained in the data store 210. This aggregation of data, in an embodiment, includes security scores generated by the security engine 218. As discussed above, this enables organizations and entities to track security risks over time. In addition, the security engine 218 may generate recommended security actions 226 in response to a particular security score or security score associated with a particular axis. In yet other embodiments, the security engine 218 may initiate or perform certain operations in response to a particular security score or security score associated with a particular axis. For example, if a particular axis of the security score is below a threshold, the security engine 218 may perform a scan or automated analysis of source code associated with a particular application or service.

In various embodiments, the recommended security actions 226 are generated by a security engineer and provided to security engine 218 which may be part of the scoring model 224. For example, the recommended security actions 226 are based at least in part on a particular data point associated with a higher score for a particular access than the application received. Put another way, if a particular application receives a low score for a particular axis, the security engine 218 may generate recommended security actions 226 based at least in part on data points that would have resulted in a higher score for the particular axes. In a specific example, if a particular application gets a low security score for the "hardware" axis because the patch level of the particular application's host computer system is out of date, the security engine 218 generates recommended security actions 226 including, at least, updating the patch level of the host computer system. The recommended security actions 226 may also be stored in the historical data store 220. This may enable the security and maturity service 204 to track performance of the recommended security actions 226 and effectiveness of the recommended security actions 226. In addition, as described in greater detail below, a machine learning engine may use the recommended security actions 226 to update the scoring model 224, the statistical modeling engine 222, security engine 218, or other component of the security and maturity service 204.

In addition, the recommended security actions 226, in various embodiments, are provided to a computing system 234. The computing system 234 may include computing resources of the computing resource service provider 202, the software developer 232 (e.g., customer operated data center), or other entity. In one example, the computing system 234 is a web service front-end as described above in connection with FIG. 1. In such scenarios, the recommended security actions may be made available through the web-service front end. In another example, the computing system 234 is a computing resource utilized by the application or a computing resource that has access to other computing resources executing the application. The computing system 234 may also be configured to execute automated operations in response to one or more triggers included in the recommended security actions 226. For example, the recommended security actions 226 various operations such as network scan, source code scan, updated firewall settings, updated policy and/or permission information, software updates, or other operations that are capable of increasing an application's security score for one or more axes. The computing system 234 may detect one or more triggers (e.g., operations that the computing system 234 may perform) and perform various operations in response to detecting the one or more triggers.

Figure 3:
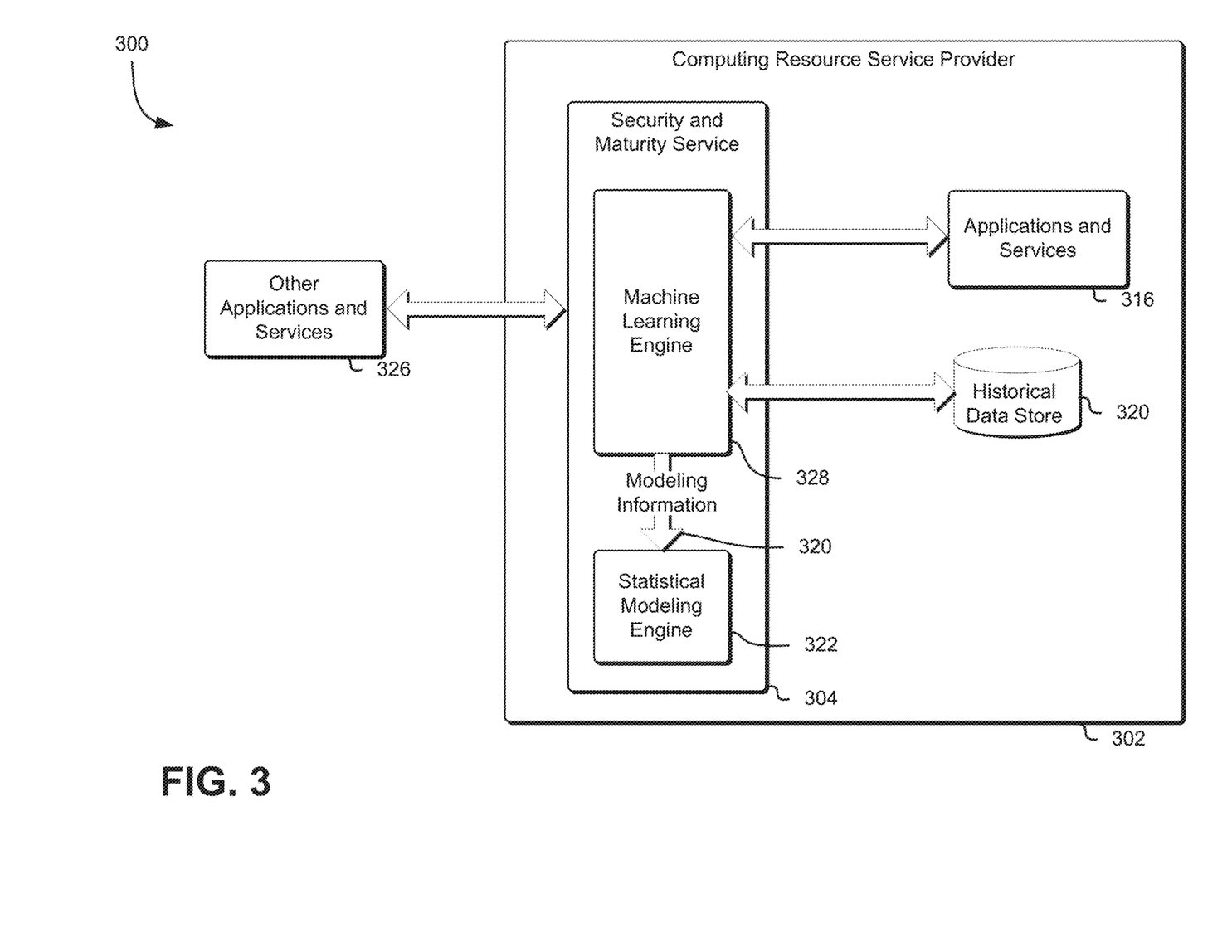
FIG. 3 illustrates an environment in which a security and maturity service may modify a scoring model based at least in part on historical data in accordance with an embodiment.

FIG. 3 illustrates an environment 300 in which a machine learning engine 328 provides modeling information 320 to a statistical modeling engine 322 of a security and maturity service 304 in accordance with an embodiment. The security and maturity service 304 may provide a security score for applications and services as described above. In addition, the computing resource service provider 302 may provide computing resources to the customer and to the security and maturity service 304 and components thereof, as described in greater detail above. The statistical modeling engine 322, as described above, may determine weights or values to be assigned to various data point as well as generating a scoring model to determine a security score for an application or service. The machine learning engine 328 may obtain application information or other information from applications and services 316. In addition, the machine learning engine 328 may also obtain information from a historical data store 320 as described above. Finally, the machine learning engine 328 may also obtain information from other applications and services 326. The other applications and services 326 may include a variety of applications executed on computing resources of a third party such as computing resources in a customer operated data center. In one example, the other applications and services 326 include a third party security service provided access to security scores and other security information of applications executed by the computing resource service provider 302 to troubleshoot and remediate security incidents associated with the applications.

In various embodiments, the machine learning engine 328 may use one or more machine learning algorithms to perform and/or various functions of the security and maturity service such as determining correlations between data points, security risks, and security scores. The one or more machine learning algorithms may include a decision tree algorithm, a probabilistic classifier algorithm, a least-squares regression algorithm, a support vector machine, or various supervised and unsupervised learning algorithms. In one embodiment, the one or more machine learning algorithms can be used to provide additional input to the statistical modeling engine 322 (e.g., modeling information 320). The modeling information 320 may include an update to a set of data points associated with a particular axis, an update to weighting information associated with one or more data points, information indicating correlations of security risks, or any other information that can be used to update the scoring model.

The machine learning engine 328 may also be used to generate an organization-specific and/or application-specific software security and maturity model and/or scoring model. In one embodiment, a security engineer or other entity of an organization provides an initial set of data points and scoring model used to determine a security score, and the machine learning engine 328 over time may adjust the data points and scoring model based at least in part on additional data points or other information that correlate with poor security performance. The machine learning engine 328 may process data from a plurality of applications and services as well as security incidents associated with the applications and services to determine correlations between data points and security risks.

For example, if an application executed from a particular region has a higher rate of security incidents than the application executed from other regions, the machine learning engine 328 then obtains information associated with the application and regions and determines a cause for the higher rate of security incidents. One such cause may be the number of hosts executing the application or the age of the hosts executing the application. The machine learning engine 328 may then update the modeling information 320 to increase the weight to the number of hosts executing the application and the age of the hosts executing the application so the data points have a greater influence on the score associated axis and the overall security score. The machine learning engine 328, in an embodiment, also determines indicators of security risks and security attacks.

Figure 4:
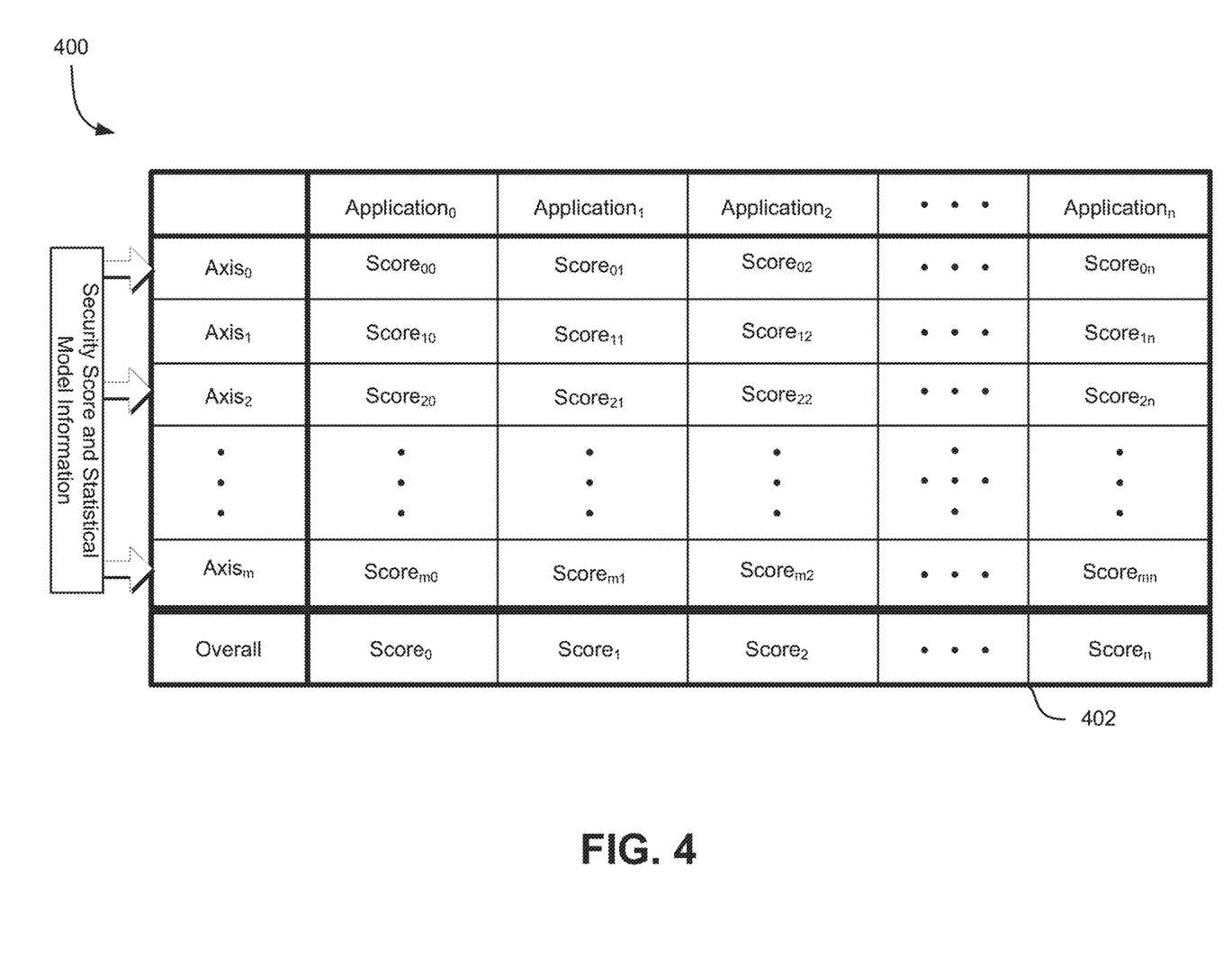
FIG. 4 is a diagram illustrating various aspects of a security score for an application across a plurality of axes in accordance with an embodiment.

FIG. 4 is a diagram 400 which illustrates various aspects of a security score for an application or service across a plurality of axes in accordance with an embodiment. The scores may represent security scores generated by a security engine of a security and maturity service as described above. In addition, the scores may be maintained in a historical data store or other storage device. Returning to FIG. 4, a set of security scores 402 with rows of axes (e.g., Axis0, Axis1, etc.) and columns of applications (e.g., Application0, Application1, etc.) has security scores (e.g., Score00, Score01, Score02, etc.) for each row and column. Each of the security score may be a measure of security risks posed to the particular application and/or a maturity level of the application. In one embodiment, the set of security scores 402 is a set of security scores for a single application over an interval of time, where Application0 represents the application at a first point in time and Application1 represents the application at a second point in time. For example, the set of security scores 402 is the entire set of security scores over a lifetime of an application. As described above, this information may enable a determination of the velocity or rate of change of the application's security risk over time.

In yet other embodiments, the set of security scores 402 is a set of security scores for a plurality of different applications scored by the security engine, where $Application_0$ represents a first application and $Application_1$ represents a second application. For example, the set of security scores 402 is the set of security scores for all of the applications of an organization. As described above, this information may enable an organization to determine an overall security score for the organization's applications as well as measure each application's security risk against each other. For example, an organization can use the set of scores 402 to determine that the organization's application scores poorly in a particular axis (e.g., network security) and, as a result, may determine to invest additional resources in the particular axis. In addition, the set of security scores 402 may be used to determine recommended security actions for a particular application based at least in part on a score for one or more axes.

Figure 5:
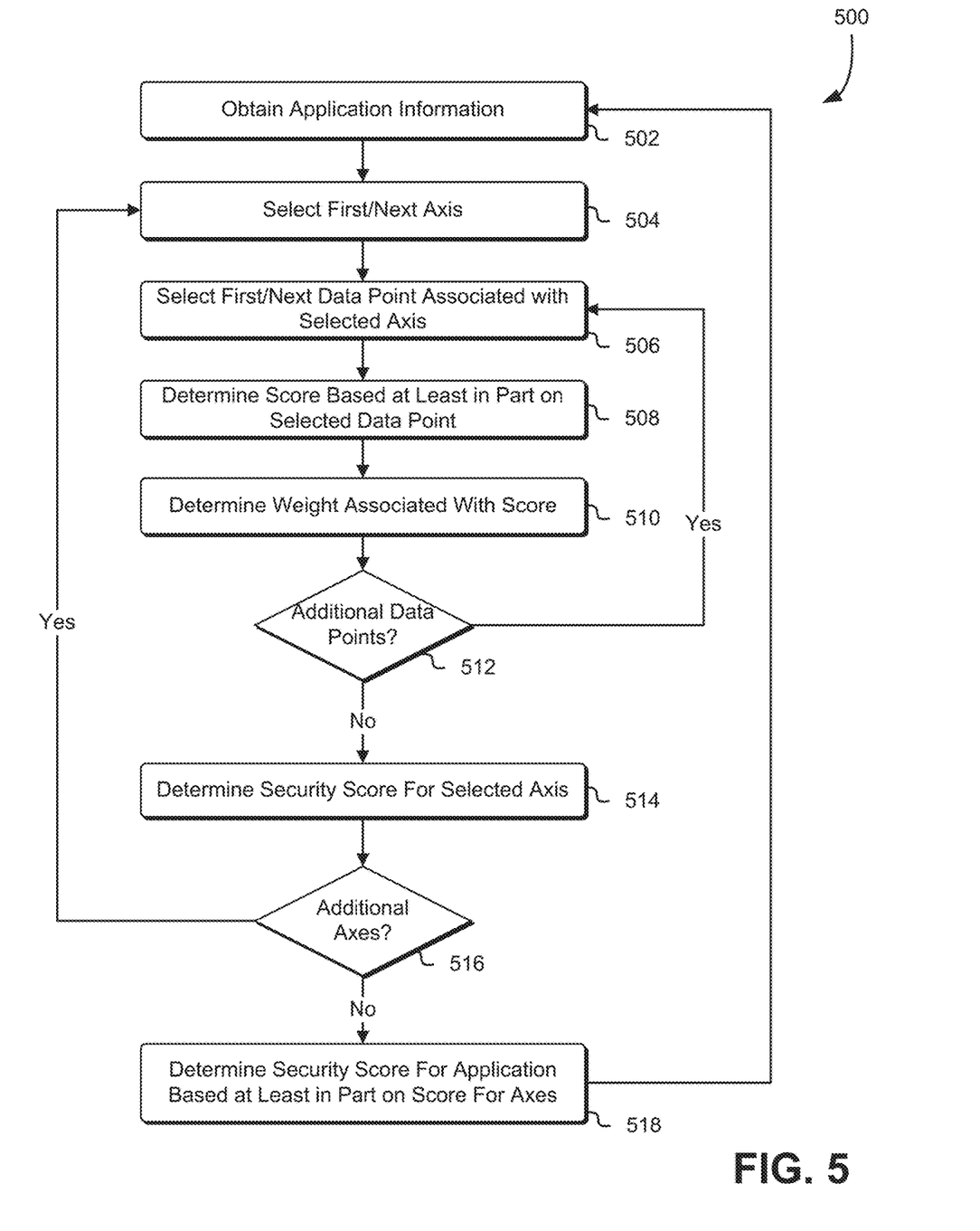
FIG. 5 illustrates a process for determining a security score for any application across one or more axes in accordance with an embodiment.

FIG. 5 is a block diagram illustrating an example of a process 500 for determining a security score for an application based at least in part on a plurality of axes in accordance with at least one embodiment. Some or all of the process 500 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 500 may be performed by any suitable system, such as a server in a data center, by various components of the environment 200 described in conjunction with FIG. 2, such as the security and maturity service 204, by multiple computing devices in a distributed system of a computing resource service provider, or by a service provided by a computing resource service provider. The process 500 includes obtaining application information 502. The application information, as described above, may include any information associated with the application for which the score is being generated, development of the application, other applications, or other systems or services executing the application. For example, the application information may include any of the data points described above in connection with FIG. 1. In addition, the application information may be obtained from computer systems supporting the application, entities associated with the application, or from a storage location such as a data store or historical data store as described above.

The system executing the process 500 may then select the first/next axis 504. As described above, the data points included in the application information may be distributed among a plurality of axes. In one embodiment, the data points are tagged (e.g., metadata associated with the data point) with a particular axis. For example, the data point representing a measure of the number of lines of code in an application may be tagged with the "application security" axis. Returning to FIG. 5, once the first/next axis has been selected, the system executing the process 500 may select the first/next data point associated with the axis 506. The data points may be included in the application information and associated with a particular axis as described above.

The system executing the process 500 may then determine a score based at least in part on the data point 508. In an embodiment, the score is determined based at least in part on a scoring model as described above. For example, a score associated with the data point may be selected based at least in part on CMM. In addition, the score may be determined based at least in part on a plurality of data points. Put in other words, multiple data points may be aggregated into a single data point for which a score may be determined based at least in part on the score model. Once a score has been determined, the system executing the process 500 may determine a weight associated with the score 510. As described above, a weight (e.g., a value between zero and one) may be associated with the data point to modify the data points influence on the security score for the selected axis. Furthermore, the weight associated with the data point may be indicated in the scoring model.

The system executing the process 500 may then determine if there are additional data points associated with the selected axis 512. If there are additional data points, the system executing the process 500 may return to step 506 and select the next data point to determine the score and weight associated with the next data point. This process may continue until all data points associated with the selected axis have been processed. Once all the data points associated with the selected axis have been processed, the system executing the process 500 may determine a security score for the selected axis 514. The security score may be determined based at least in part on the data points, the weight associated with the data points, and the scoring model as described above. For example, the number of new lines of code is 400 and one new API is defined, a weight of 0.5 is assigned to the number of new lines of code, and a weight of 1 is assigned to the number of newly defined APIs. Furthermore, the scoring model may indicate that 400 or more new lines of code is associated with a score of 2 and 1, or fewer newly defined API calls is associated with a score of 5. Based at least in part on this information, a score of 4.5 may be determined and assigned to the axis.

The system executing the process 500 may then determine if additional axes remain to be scored 516. If additional axes remain, the system executing the process 500 may return to step 504 and select the next axis. The system executing the process 500 may then continue the process 500 and determine a score associated with the next axes. If no axes remain, the system executing the process 500 may then determine a security score for the application based at least in part on the score for the axes 518. A variety of different mechanisms may be used to determine the overall security score based at least in part on the scores for the axes. For example, the scores for each axis may be averaged. In addition, a customer or software developer may determine the mechanisms for determining the overall security score. Furthermore, the system executing the process 500 may return to step 502 and generate a new security score for the application.

Note that one or more of the operations performed in 502-518 may be performed in various orders and combinations, including in parallel. For example, the system executing the process 500 may determine the score for each axes in parallel. In numerous variations to the process 500, one or more of the operations 502-518 may be omitted or performed by other systems of services. For example, no weighting may be applied to the data points. In addition, the customer or software developer may define a particular weighting on the data points or may define a minimum threshold for a particular data point or axes.

Figure 6:
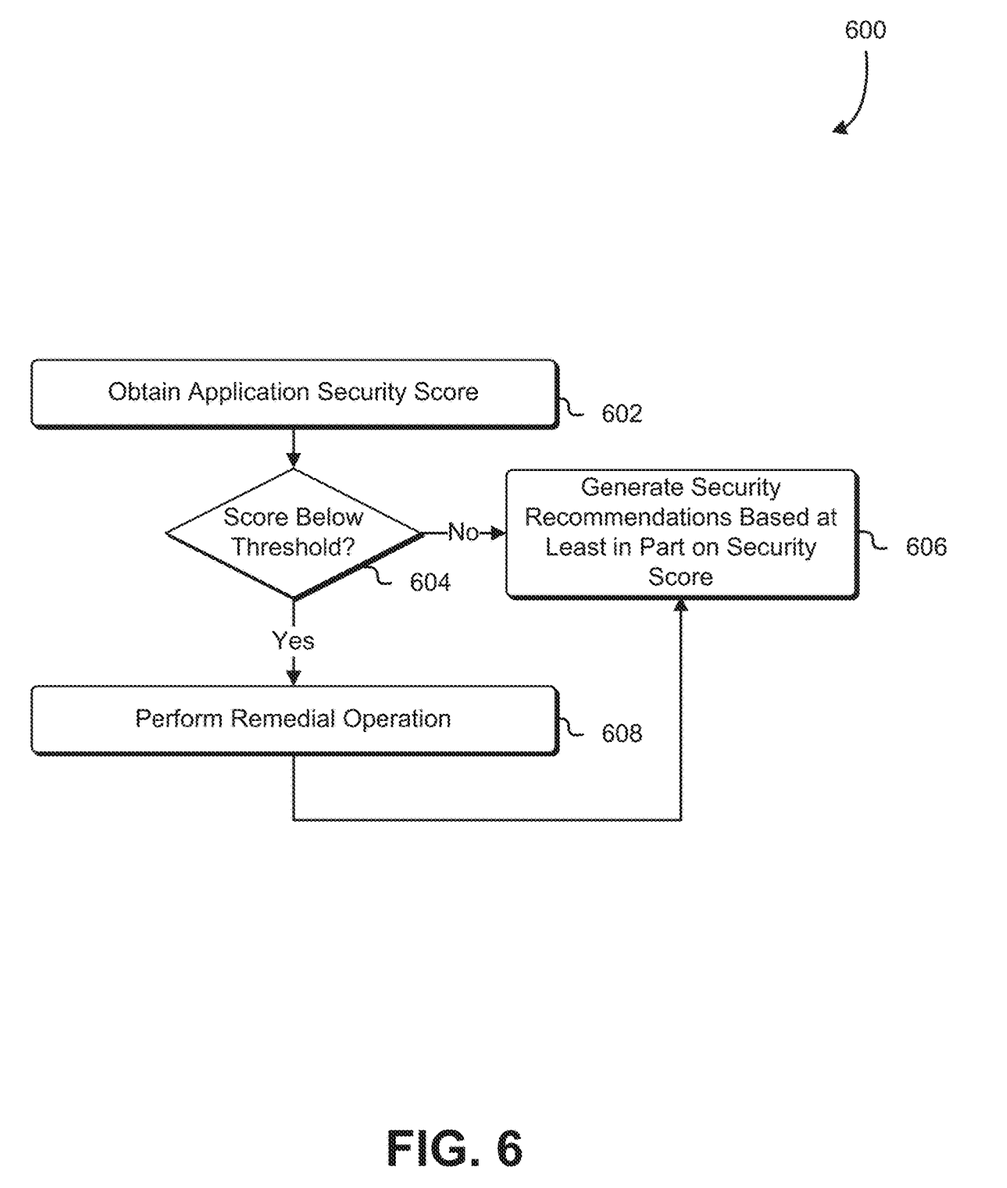
FIG. 6 illustrates a process for generating a set of security recommendations based at least in part on a security score for an application in accordance with an embodiment.

FIG. 6 is a block diagram illustrating an example of a process 600 for generating recommended security actions for an application in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 200 described in conjunction with FIG. 2, such as the security and maturity service 204, by multiple computing devices in a distributed system of a computing resource service provider, or by a service provided by a computing resource service provider. The process 600 includes obtaining an application security score 602. The application security score may be determined by a security engine of the security and maturity service as described above. In one embodiment, the application security score is obtained from a historical data store.

The system executing the process 600 may then determine if a score for a particular axis is below a threshold 604. The threshold may be defined by a customer or software developer associated with the application. If the score is not below the threshold, the system executing the process 600 may generate security recommendations based at least in part on the security score. The security recommendation, as described, may be based at least in part on the scoring model and may define operations that, once performed, may increase the security score. In addition, the security recommendations may indicate a particular security threat associated with the score.

Returning to FIG. 6, if the score is below the threshold, the system executing the process 600 may perform remedial operations 608. The remedial operations may be defined by the customer or software developer, security engineers, scoring model, or other entity. The remedial operations include a variety of operations such as transmitting a notification, generating an incident report, executing an application (e.g., network scan), modifying a setting of the application, preventing access to the application, preventing an operation of the application, preventing the software developer from updating the application, or other operation suitable for remediating a security risk to the application. Once the remedial operation is performed, the system executing the process 600 may return to step 606.

Note that one or more of the operations performed in 602-608 may be performed in various orders and combinations, including in parallel. For example, the system executing the process 600 may determine if the score for a particular axis is below multiple thresholds. For example, the customer may define a first threshold that, when the score for the particular axis is under, causes the system executing the process 600 to transmit a notification and a second threshold, lower than the first threshold, that if the score for the particular axis falls below causes the system executing the process 600 perform a remedial operation. In numerous variations to the process 600, one or more of the operations 602-608 may be omitted or performed by other systems of services. For example, the remedial operations may be performed by a plurality of computer systems.

Figure 7:
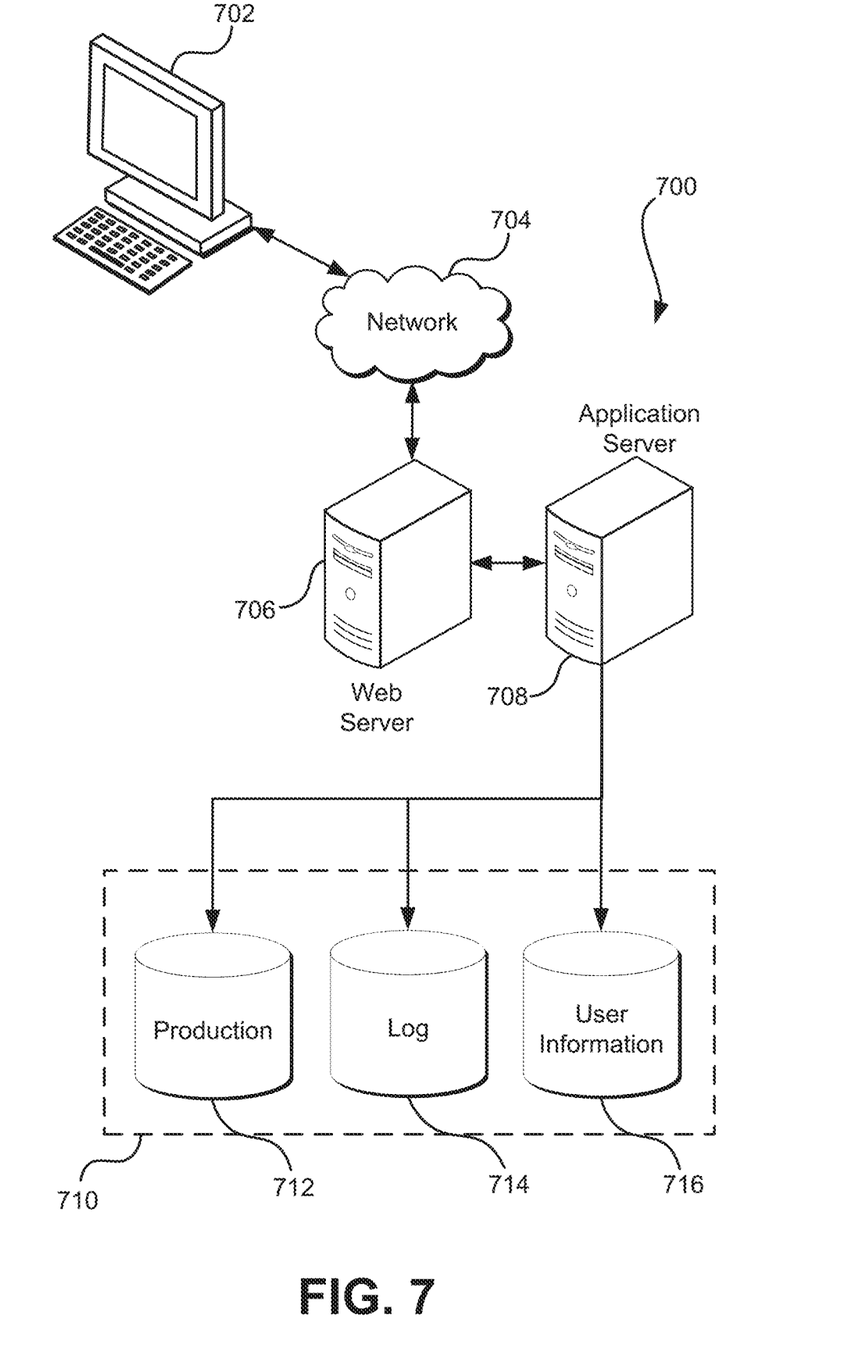
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a set of computing resources provided by a computing resource service provider, a plurality of data points indicating application information associated with an application, the application executed by the set of computing resources provided by the computing resource service provider;
   determining a plurality of security scores for a plurality of axes based at least in part on the plurality of data points and a scoring model, the plurality of axes defined by the scoring model, where the first data point of the plurality of data points is associated with a particular axis and assigned a weight corresponding to an influence on a security score of the plurality of security scores for the particular axis;
   determining, by a statistical modeling engine, an overall security score for the application based at least in part on the plurality of security scores;
   determining a correlation between the first data point of the plurality of data points and a security risk based at least in part on historical data maintained in a data store indicating a previously recorded data point associated with the security risk;
   updating a weight assigned to the first data point based at least in part on the correlation;
   determining a set of security recommendations based at least in part on the plurality of security scores, including the weight assigned to the first data point, and the scoring model;
   providing the overall security score and the set of security recommendations to a computing resource of the set of computing resources associated with the application and provided by the computing resource service provider; and
   executing, by the set of computing resources provided by the computing resource service provider, automated operations in response to one or more triggers included in the set of security recommendations.

2. The computer-implemented method of claim 1, wherein the computer-implemented method further comprises assigning security resources to the application based at least in part on the overall security score.

3. The computer-implemented method of claim 1, wherein the computer-implemented method further comprises:
   performing a comparison of a first security score of the plurality of security scores associated with a first threshold; and
   as a result of the comparison indicating a potential security risk, transmitting a notification to an entity associated with the application.

4. The computer-implemented method of claim 3, wherein the computer-implemented method further comprises:
   performing a second comparison of the first security score of the plurality of security scores associated with a second threshold; and
   as a result of the second comparison indicating an additional security risk, performing a remedial operation.

5. A system, comprising:
   at least one computing device implementing one or more services, wherein the one or more services:
   obtain, from a set of computing resources provided by a service provider, a plurality of data points indicating application information of an application a number of data points of the plurality of data points associated with an axis of a plurality of axes;
   determine a security score for the application by at least:
      determining a plurality of axis scores for the plurality of axes based at least in part on a portion of data points of the plurality of data points and a scoring model; and
      determining the security score for the application based at least in part on the plurality of axis scores;
   determine a correlation between a first data point of the plurality of data points and a security risk to the application based at least in part on the security score, the plurality of axis scores, and historical data indicating a previous data point associated with the security risk;
   update a weighting value associated with the first data point based at least in part on the correlation;
   cause the security score, the correlation, and the plurality of axis scores to be stored; and
   cause an operation to be performed by a computing resource of the set of computing resources in response to a trigger indicated based at least in part on the security score.

6. The system of claim 5, wherein the one or more services further generate security recommendations based at least in part on the plurality of axis scores and the scoring model.

7. The system of claim 5, wherein the scoring model defines a maturity level for a particular axis of the plurality of axes based at least in part on the portion of data points of the plurality of data points.

8. The system of claim 5, wherein the scoring model is a Capability Maturity Model.

9. The system of claim 5, wherein determining the correlation between the first data point of the plurality of data points and the security risk to the application further comprises determining the correlation based at least in part on a machine learning algorithm.

10. The system of claim 9, wherein the one or more services further determine the weighting value associated with the first data point based at least in part on an age associated with a host executing the application.

11. The system of claim 10, wherein the one or more services further update the weighting value associated with the first data point of the plurality of data points based at least in part on a second correlation between a second data point of the plurality of data points and the security risk determined based at least in part on the machine learning algorithm.

12. The system of claim 5, wherein the one or more services further update the scoring model based at least in part on the correlation between the first data point of the plurality of data points and the security risk.

13. A non-transitory computer-readable storage medium storing thereon executable instructions that, as a result of being executed by one or more processors of a computer system, cause the computer system to at least:

obtain application information associated with an application from a set of computing resources of a computing resource service provider, the application information including a plurality of data points, a first data point of the plurality of data points associated with an axis of a plurality of axes defined by a security maturity model;

determine a correlation between a second data point and a security risk based at least in part on historical information associated with data points of the application stored in a data store;

determine a weight to assign the second data point based at least in part on the correlation;

determine a score for the axis based at least in part on the plurality of data points including the weight assigned to the second data point, and the security maturity model;

generate a security recommendation based at least in part on the score; and  cause a first computing resource of the set of computing resources provided by the computing resource service provider to execute instructions indicated in the security recommendation.

14. The non-transitory computer-readable storage medium of claim 13, wherein the instructions further comprise instructions that, as a result of being executed by the one or more processors, cause the computer system to determine a second score for a second axis based at least in part on the second data point of the plurality of data points and the security maturity model.

15. The non-transitory computer-readable storage medium of claim 14, wherein the instructions further comprise instructions that, as a result of being executed by the one or more processors, cause the computer system to determine an overall security score of the application based at least in part on the score and the second score.

16. The non-transitory computer-readable storage medium of claim 13, wherein the instructions further comprise instructions that, as a result of being executed by the one or more processors, cause the computer system to:

obtain a second plurality of data points, the second plurality of data points being an update to the plurality of data points; and  determine an update to the score based at least in part on the second plurality of data points and the security maturity model.

17. The non-transitory computer-readable storage medium of claim 13, wherein the instructions further comprise instructions that, as a result of being executed by the one or more processors, cause the computer system to store a historical snapshot of the application including the plurality of data points and scores associated with the plurality of axes.

18. The non-transitory computer-readable storage medium of claim 13, wherein the instructions that cause the computer system to generate the security recommendation further include instructions that cause the computer system to determine an operation that, if performed, would cause an increase to the score for the axis.

19. The non-transitory computer-readable storage medium of claim 13, wherein the instructions further comprise instructions that, as a result of being executed by the one or more processors, cause the computer system to determine a set of security resources to assign to the application based at least in part on the score.

20. The non-transitory computer-readable storage medium of claim 13, wherein the instructions further comprise instructions that, as a result of being executed by the one or more processors, cause the computer system to cause at least one other computer system to perform an operation resulting in an increase in the score based at least in part on the security recommendation.

\* \* \* \* \*